Patented May 30, 1933

1,911,219

UNITED STATES PATENT OFFICE

WALTER BAUER AND PAUL WEISERT, OF DARMSTADT, GERMANY, ASSIGNORS TO ROHM & HAAS AKTIENGESELLSCHAFT, OF DARMSTADT, GERMANY

PROCESS FOR THE PREPARATION OF ACRYLIC ACID

No Drawing. Application filed February 25, 1931, Serial No. 518,293, and in Germany March 21, 1930.

The invention relates to an improved process for the preparation of acrylic acid from acrolein.

It has not been possible heretofore to produce acrylic acid directly from acrolein in appreciable amounts. According to the literature, acrolein possesses an acid reaction after contact with oxygen. The taking up of the oxygen, however, occurs only in small amounts, and polymerization of the acrolein always takes place. The acid which is produced is stated to be identical with the acrylic acid obtained from acrolein and silver oxide. However, from the description of the acid and the ethyl ester thereof, it is clear that no acrylic acid can have been actually present. Later investigations have shown that it is, in fact, not possible in this way to produce acrylic acid in appreciable amounts by the action of oxygen on acrolein. Oxidation of acrolein by means of silver oxide to produce acrylic acid is not capable of being carried out commercially. The process becomes far too expensive by the use of silver oxide and the yields are extraordinarily slight. The reason for this lies in the fact that acrolein, because of double bonds, is a very labile substance, which even in the pure condition exhibits a great tendency toward polymerization and is readily attacked by oxidizing agents at the carbon double bond and broken up. Under conditions of oxidation, condensation reactions also occur, which lead to additional by-products.

We have found that in spite of these difficulties, acrylic acid can be prepared with good yield from acrolein, if the acrolein, in suitable dilution, is brought into reaction with oxygen or oxidizing agents. As diluents, organic solvents, particularly aromatic hydrocarbons, carbon tetrachloride, etc., have been found suitable. Limitation of the invention to the use of these liquid diluents is, however, not intended. Water is to be excluded from the reaction. In the presence of such slight amounts of water as are customarily dissolved in benzol it is still possible to operate successfully. The oxidation reaction, however, is injuriously affected by substantial quantities of water, inasmuch as hydroxyl groups have an injurious effect. The polymerization can be completely avoided. The oxidation velocity is favorably influenced by auxiliary means, such as, for example, the use of increased temperature, increased pressure, shaking and stirring of the reaction liquid. These means may be applied separately or in combination.

The term "agitation" as used in the accompanying claims is intended to cover stirring or shaking or both.

Instead of acrolein, chemically equivalent aldehydes can be oxidized to the corresponding acids by a similar process.

Example 1

Air is passed through a 20% solution of acrolein in benzol at 50° C. for 20 hours at ordinary pressure. 7% of the acrolein is converted into acrylic acid.

Example 2

A 50% solution of acrolein in benzol is maintained for 14 hours at 50° C. under an oxygen pressure of 10 atmospheres. 73% of the acrolein used is converted into acrylic acid.

What we claim is:

1. Process for the preparation of acrylic acid, whereby acrolein dissolved in a substantial quantity of a liquid solvent is subjected to the action of an oxidizing gas having a free oxygen constituent, under substantially anhydrous conditions.

2. Process as set forth in claim 1, especially characterized by the use of organic solvents.

3. A process as set forth in claim 1 in which the solvent is an aromatic hydrocarbon.

4. A process for the preparation of acrylic acid which comprises subjecting dilute acrolein dissolved in a substantial quantity of an organic solvent to the action of an oxidizing gas having a free oxygen constituent.

5. A process for the preparation of acrylic acid which comprises subjecting dilute acrolein, under substantially anhydrous conditions, to the action of an oxidizing gas having a free oxygen constituent, the acrolein undergoing treatment being dissolved in a substantial quantity of a liquid solvent.

6. A process for the preparation of acrylic acid which comprises subjecting dilute acrolein, under substantially anhydrous conditions, to the action of an oxidizing gas having a free oxygen constituent, the reaction being carried out at a temperature of approximately 50° C., and the acrolein undergoing treatment being dissolved in a substantial quantity of a liquid solvent.

7. A process for the preparation of acrylic acid which comprises subjecting dilute acrolein, under substantially anhydrous conditions, to the action of an oxidizing gas having a free oxygen constituent, the reaction being carried out under greater than atmospheric pressure, and the acrolein undergoing treatment being dissolved in a substantial quantity of a liquid solvent.

8. A process for the preparation of acrylic acid which comprises subjecting dilute acrolein under substantially anhydrous conditions, to the action of an oxidizing gas having a free oxygen constituent, the operation being carried out under greater than normal atmospheric temperature and pressure conditions, accompanied by agitation, and the acrolein undergoing treatment being dissolved in a substantial quantity of a liquid solvent.

9. A process for the preparation of acrylic acid which comprises passing air through a 20% solution of acrolein in benzol.

10. A process for the preparation of acrylic acid which comprises passing oxygen through a solution of acrolein in benzol, under greater than atmospheric pressure.

11. A process for the preparation of acrylic acid which comprises passing an oxidizing gas having a free oxygen constituent through a dilute solution of acrolein in a substantial quantity of an organic solvent, under greater than normal atmospheric pressure conditions.

12. Process in accordance with claim 1, characterized by the fact that the conversion is carried out at greater than normal atmospheric pressure.

13. Process in accordance with claim 1, characterized by the fact that the conversion is accompanied by agitation.

14. Process in accordance with claim 1, characterized by the fact that the conversion is carried out at greater than normal atmospheric pressure and with agitation.

15. Process in accordance with claim 1, characterized by the fact that the conversion is produced at greater than normal atmospheric pressure and temperature.

16. Process in accordance with claim 1, characterized by the fact that the conversion is carried out at greater than normal atmospheric pressure and temperature, and with agitation.

In testimony whereof we affix our signatures.

WALTER BAUER.
PAUL WEISERT.